UNITED STATES PATENT OFFICE.

SILVIO DI FILIPPO, OF TOLEDO, OHIO.

FIREPROOFING COMPOSITION.

1,396,264.     Specification of Letters Patent.      Patented Nov. 8, 1921.

No Drawing.      Application filed November 13, 1920. Serial No. 423,805.

*To all whom it may concern:*

Be it known that I, SILVIO DI FILIPPO, a citizen of the United States, residing at Toledo, in the county of Lucas, State of Ohio, have invented certain new and useful Improvements in Fireproofing Compositions; and I do hereby declare the following to be a full, clear, and exact description of the invention, such as will enable others skilled in the art to which it appertains to make and use the same.

This invention relates to fire proofing compositions and has for its object to provide a composition that will render fire proof such ordinarily inflammable materials as may be dipped into it, such as cloth, wood and paper.

In the preparation of the composition in question, I mix into 200 pounds of water, 16 pounds of ammonium sulfate; 3 pounds of potassium bicarbonate; 6 pounds of boracic acid and 34 pounds of borax, which will place in complete solution, the initially solid ingredients. The material to be treated is submerged for approximately half an hour in the solution thus formed after which it is taken out and permitted to dry. It is found that the material as thus treated, does not kindle when exposed to a flame.

What is claimed is:

A fire proofing composition consisting of the ingredients and proportions substantially as follows: ammonium sulfate, 16 pounds; potassium bicarbonate, 3 pounds; boracic acid, 6 pounds; borax, 34 pounds; water 200 pounds.

In testimony whereof, I affix my signature, in the presence of two witnesses.

SILVIO DI FILIPPO.

Witnesses:
ALBERT V. NEWTON,
MARY E. COLLINS.